3,227,350
WELDING RING
Helmut John Thielsch, Cranston, R.I., assignor to Grinnell Corporation, Providence, R.I., a corporation of Delaware
Continuation of application Ser. No. 813,751, May 18, 1959. This application Apr. 16, 1962, Ser. No. 187,879
5 Claims. (Cl. 228—56)

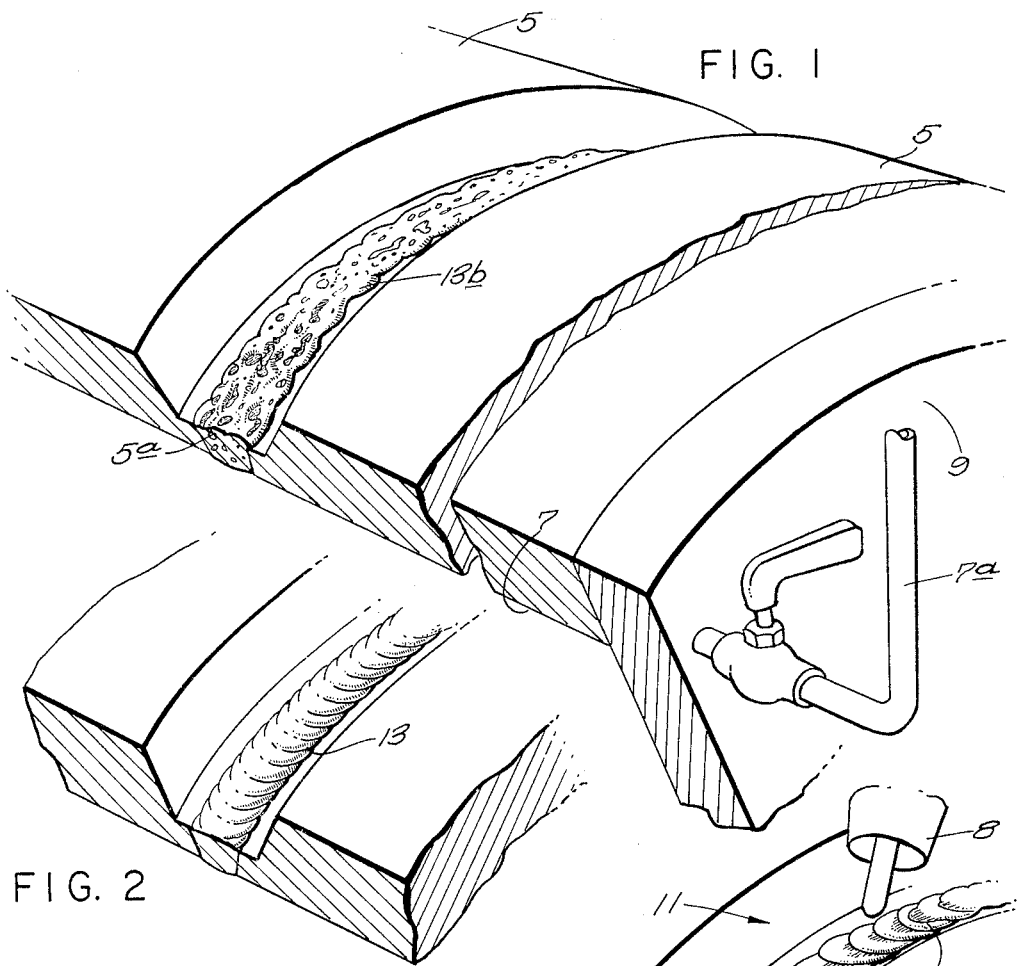

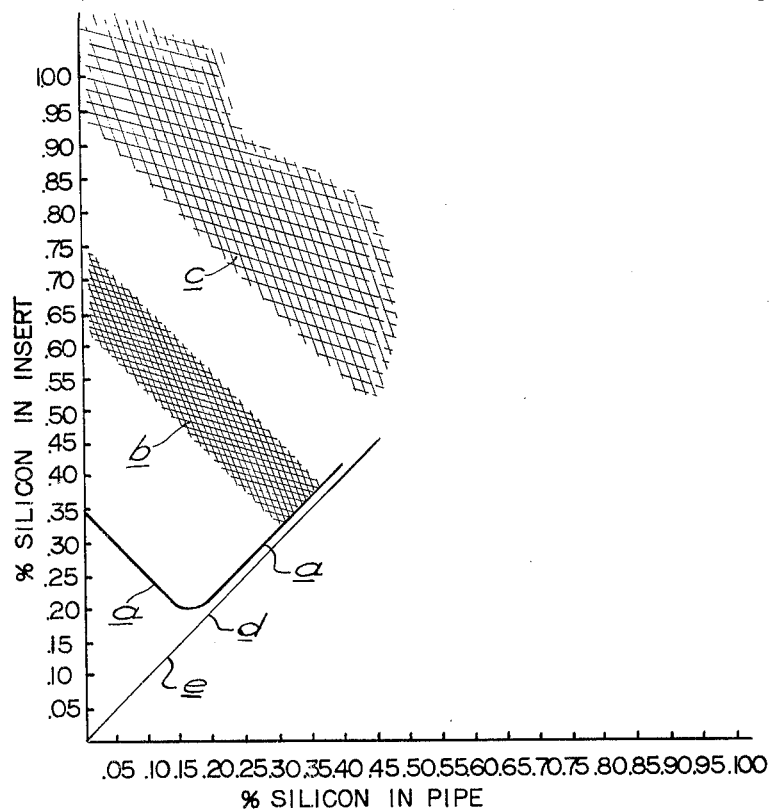
FIG. 6
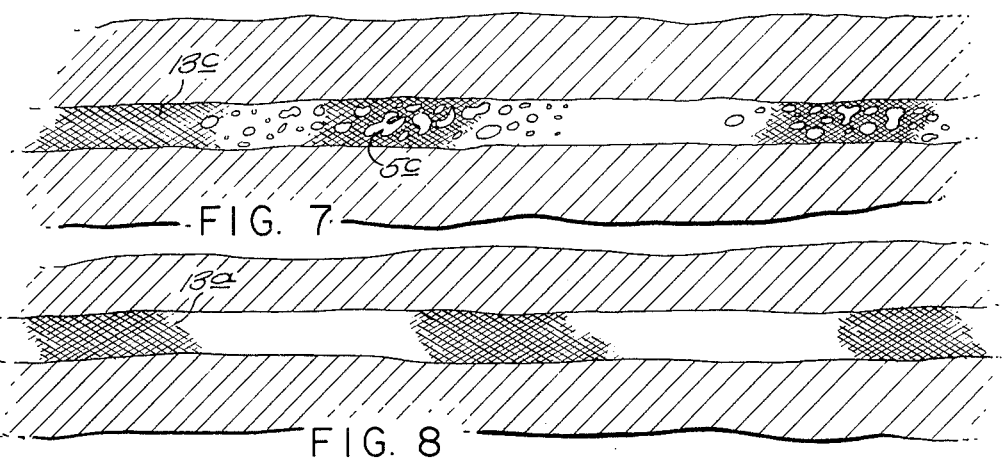
FIG. 7
FIG. 8

# United States Patent Office 3,227,350
Patented Jan. 4, 1966

This application is a continuation of application Serial No. 813,751, now abandoned.

The present invention relates to the welding, more particularly butt welding, of carbon steel parts such as pipes, plates, etc.

The use of non-fluxing type welding processes such as the inert-gas, tungsten-arc welding process (inert gas refers not only to the commonly known inert gases such as argon but also to gases such as carbon dioxide) has many advantages over other welding techniques in butt welding. Consequently about eighty or ninety percent of all butt welds in stainless steel piping are made by these processes.

Despite the advantages of these processes the successful commercial use thereof has thus far been limited to welding the so-called stainless steels and they have not been adopted for butt welding plain carbon steels because of the formation of bubbles, porosity and blowback (all of which are hereinafter referred to as bubbles) in the weld. These are believed to be caused by air and free oxygen in the weld puddle which come from the metal and from the atmosphere. It has been found that the amount of these bubbles depends upon the following: (1) the composition of the carbon steel—there are less with the more highly deoxidized carbon steel grades in which deoxidizers have been added to kill the steel; (2) the temperature of the welding operation—the higher the temperature the greater the bubbling; (3) the length of time at which the welding temperature is maintained—the greater the length of time the greater the bubbling; (4) the amount of pipe material which is melted—the greater the amount melted the greater the bubbling; (5) the rate of cooling of the weld—the faster this rate the greater the bubbling; (6) whether the pipe is filled with inert gas during welding—if so, the less the amount of bubbling. Factors (2) to (5) above depend upon the skill of the welder.

It has been discovered that the problem presented by these bubbles can be eliminated to thereby make commercially practical the use of non-fluxing type welding processes with carbon steel piping by the use of a carbon steel insert containing one or more metals of a class of metals commonly known as deoxidizers such as silicon, aluminum, titanium, boron, vanadium, zirconium, chromium and manganese in an amount which is substantially greater in deoxidizing effect than the amount in the pipe, the proper amount of deoxidizer in the insert depending upon the composition of the pipe and the welding conditions referred to above and being readily ascertainable by routine tests.

With good welding conditions and a carbon steel pipe composition having substantially no deoxidizer the minimum amount of silicon in the insert would be about 0.35% (or an equivalent amount in deoxidizing effect of another deoxidizer alone or an equivalent amount in deoxidizing effect of a combination of deoxidizers as set forth hereinafter). A safer amount to take care of poorer welding conditions with the same pipe composition would be greater, for example about 0.65%. With good welding conditions and with a carbon steel pipe composition having about 0.15% silicon or its equivalent the minimum can be as low as about 0.20% but to take care of poorer welding conditions with the same pipe composition a safer amount would again be greater, for example about 0.50%. With any welding conditions and any carbon steel pipe composition about 0.95% silicon will insure a good weld.

When the above amounts of deoxidizer in the insert are used it has been found quite unexpectedly that the welds obtained are substantially bubble-free. The term "bubble-free" as used herein means that the weld is sufficiently free of bubbles to be satisfactory for its intended use. A weld can be satisfactory for its intended use if it contains some bubbles.

As used herein the term plain carbon steel means an alloy of iron and carbon in which substantially the only deoxidizer metals added are for the purpose of killing or rimming the steel. The term includes unkilled, killed, semi-killed and rimmed carbon steels. This term is used interchangeably herein with the term carbon steel. These terms are defined on pages 217 and 295 of "Metallurgy" 4th Edition, by Johnson & Weeks, published 1957 by American Technical Society, Chicago, Illinois.

The invention will be better understood by reference to the accompanying drawings in which:

FIG. 1 is a perspective partially in section of a pair of carbon steel pipe sections joined together by a root pass butt weld formed with an insert and by an inert-gas, tungsten arc welding process in which the insert is made of conventional carbon steel having the same composition as the pipe segments.

FIG. 2 is a view corresponding to that of FIG. 1 in which the weld was made in accordance with the present invention.

FIG. 3 is a view like FIG. 2 showing a portion of the insert and portions of the roots of the pipe segments before they are welded and other portions which have been welded.

FIG. 4 is a view like FIG. 2 in which the weld was made in accordance with the present invention but under poorer welding conditions than in FIG. 2.

FIG. 5 is a fragmentary view corresponding to a portion of FIG. 3 showing another form of the insert.

FIG. 6 is a graph showing the relationship of the proper amounts of silicon deoxidizer in the insert to the amounts of silicon deoxidizer in the pipe composition, assuming that silicon is the only deoxidizer present in the insert and pipe in significant quantities.

FIG. 7 is a representation of a radiograph of a weld like that shown in FIG. 1.

FIG. 8 is a representation of a radiograph of a weld like that shown in FIG. 2.

With reference to FIG. 3, a carbon steel insert ring 2 was tack welded between the opposed faces 4 of the roots 6 of a pair of pipe segments 5 to be joined together. This ring was fused with the ends of the roots in a known manner during a root pass by the electrode 8 of known inert-gas, tungsten-arc welding equipment.

It is preferred to replace the air in the interior 7 of the pipe with an inert gas, such as argon, by means of a gas conduit 7a extending through one of a pair of temporary plates 9 covering the ends of the pipe segments.

The weld puddle 10 usually consists of approximately 25 to 35% of molten insert and the balance is molten base metal from the pipe roots.

After the root pass, the weld would be completed in the conventional manner to fill in the space between the two pipe sections.

These pipe segments were made of A-106 carbon steel and the root pass welding operation was carried out under good welding conditions which resulted in the uniform weld width shown in FIGS. 2 and 3.

Example 1

Specifically, the composition of the carbon steel pipe segments 5, the carbon steel ring 2 and the final weld 13 (FIG. 2) were as follows:

| Initial material | C | Mn | Si | P | S | Al |
| --- | --- | --- | --- | --- | --- | --- |
| Pipe | 0.19 | 0.64 | 0.10 | *0.009 | *0.037 | *0.002 |
| Insert ring | 0.12 | 1.03 | 0.46 | *0.011 | *0.025 | *0.003 |
| Weld (fusion product) | 0.15 | 0.70 | 0.16 | *0.011 | *0.028 | *0.002 |

*These amounts are considered to be traces.

All numbers indicating steel compositions herein are percent by weight.

Since the weld puddle consisted of approximately 25 to 35% of insert ring which contained a substantially greater amount of silicon and manganese deoxidizers than the pipe material and the balance was pipe material, the finished weld 13 contained less of these deoxidizers than the insert ring 2 but more than the pipe material.

Some of the deoxidizer originally present in the insert and segments which are melted during welding are carried out of the molten metal as slag, so that the total amount of deoxidizer in the solidified weld is less than the total initial amount in the steel which was melted.

Example 2

| Initial material | C | Mn | Si | P | S | Al |
| --- | --- | --- | --- | --- | --- | --- |
| Pipe (A-53) | 0.26 | 0.69 | 0.04 | *0.007 | *0.028 | *0.002 |
| Insert ring | 0.12 | 1.03 | 0.46 | *0.011 | *0.025 | *0.003 |
| Weld | 0.19 | 0.73 | 0.12 | *0.010 | *0.028 | *0.002 |

*These amounts are considered to be traces.

In both Examples 1 and 2 in which the carbon steel insert contains a substantially greater amount of deoxidizer than the pipe material, the root pass weld was substantially bubble-free along its length, as shown in FIGS. 2, 3 and 4 and as distinguished from the root pass weld shown in FIG. 1 which was made in the same way as those shown in FIGS. 2, 3 and 4 except that the insert ring had the same composition as the pipe material. Note the large number and large size of the bubbles 5a in the weld of FIG. 1.

The radiograph shown in FIG. 8 is a representation of a radiograph of a weld 13a like that shown in FIGS. 2 and 3 which was made in accordance with the present invention and shows the weld to be bubble-free over its length whereas a radiograph of the weld 13b of FIG. 1 is represented by the weld 13c of the radiograph shown in FIG. 7. This shows such a large number of bubbles 5c of such large size that the weld 13b is unsatisfactory.

An example of the dimensions of the pipe of FIGS. 1 to 5 would be as follows: O.D.—6.625 inches, I.D.—6.065 inches, wall thickness—0.280 inch, thickness of roots 6—.093 inch. An example of the dimensions of the ring shown in FIG. 3 would be: O.D.—6.346 inches, I.D.—5.971 inches, thickness—0.0625 inch.

Example 3

The pipe and insert ring used in FIG. 4 had the same compositions as those used in FIGS. 2 and 3 but the welding was done under poorer welding conditions. Thus, some of the portions 12 of the weld puddle are wide and contain as much as 85% to 90% of the pipe material, the temperatures were higher than those used in FIGS. 2 and 3 and some parts of the puddle were kept at these high temperatures a relatively long time. However, because the ring had the proper amount of deoxidizer, the weld is substantially bubble-free and a radiograph of it would correspond to the radiograph shown in FIG. 8.

The compositions of the finished welds of Examples 1, 2 and 3 fall within the requirements of the respective ASTM specifications and are sound metallurgically.

It is believed that the bubbles in the weld of FIG. 1 are formed from oxygen which originates in part from decomposition of oxides in the pipe when it is melted, in part from oxygen which is dissolved in the pipe when it is made and thrown out of solution by the rapid cooling of the weld puddle, and in part from oxygen from the surrounding atmosphere which is dissolved into the molten puddle and thrown out of solution when the puddle is rapidly cooled.

In Examples 1, 2 and 3 the insert contains sufficient deoxidizer together with the deoxidizer in the pipe material melted into the weld puddle, to take care of substantially all of the gas which forms the bubbles (and which is believed to be oxygen) and thereby eliminates such bubbles.

The minimum amount of deoxidizer in the insert is the amount required to eliminate the bubbles and since the amount of bubbles varies according to whether the weld is made under good or poor conditions it follows that the minimum amount of deoxidizer depends on such conditions including the amount of pipe material melted. Since the deoxidizer present in the pipe material is effective to help eliminate bubbles the minimum amount of deoxidizer present in the insert also depends upon the deoxidizer content of the pipe material. When the pipe material contains more deoxidizer less is needed in the insert.

The relationship of the minimum amount of silicon deoxidizer (assuming that this is the only deoxidizer therein) in the insert to the amount of silicon in the pipe (same assumption) is shown as line a in FIG. 6 for good welding conditions, e.g. FIG. 2, but a safer amount to insure a substantially bubble-free weld even with poorer welding conditions, e.g. FIG. 4 is within the shaded band b in FIG. 6.

As a practical matter, it is desirable to include in the insert an amount of deoxidizer which is in excess of even the safe amount required for poor welding conditions and which is within the area c in FIG. 6.

With reference to FIG. 6, if the amount of silicon in the pipe is 0.05% and the welding conditions are to be good, the minimum amount of silicon in the insert to eliminate bubbling would be 0.30%. On the other hand if the welding conditions are to be poor with the same pipe a safer amount would be about 0.60%. An amount equal to about 0.90% silicon in the insert would definitely insure against bubbling for this pipe material.

With reference to FIG. 6, the minimum amount of silicon in the insert under good welding conditions is 0.2% with a pipe containing 0.15% silicon and is 0.35% silicon under such conditions with a pipe containing substantially no silicon. However, to protect against poorer welding conditions a safer amount of silicon in the insert is 0.5% with a pipe containing 0.15% silicon and 0.65% with a pipe containing substantially no silicon. It is apparent that 0.65% silicon will insure a bubble-free weld under good and poor welding conditions and with all carbon steel pipe compositions. However, to insure against bubbles under welding conditions even worse than poor it is best to have an even greater excess falling within or above the band c. It is apparent that 0.95% silicon in the insert provides a safe insert for all carbon steel pipe materials and all conditions.

Consequently, it can be said that the minimum amount of silicon in the insert may vary from between 0.2% and 0.35%, more broadly from between 0.2% and .65% and still more broadly between 0.2% and .95%.

Although the minimum amount of silicon in the insert may decrease as the amount of silicon in the pipe increases, the silicon content in the insert ring should always be higher than that in the pipe in order to improve the weld. Thus, in the graph the line a turns at d at which the silicon content of the insert is slightly higher than that of the pipe and it then extends upwardly as line a' parallel to the line e on which the silicon content of the insert is equal to the silicon content of the pipe. Otherwise, the use of the ring would be detrimental rather than beneficial. Thus, with good welding conditions silicon contents in the insert in the areas of the graph above the line a–a' will give bubble-free welds. However, silicon contents in the insert in the areas of the graph within or above the band b will provide a safety factor for poorer welding conditions, whereas to insure a bubble-free weld under welding conditions even worse than poor, the silicon contents of the insert may be within or above the band c.

I have shown b and c as bands because safe and excess amounts of deoxidizer may vary somewhat within the bands.

As has been stated, as the silicon content in the steel of the pipe is increased, the tendency to bubble will decrease but conventional carbon steel very seldom contains enough deoxidizer to prevent bubbling. That is why bubbling has presented a problem in butt welding carbon steel parts with non-fluxing, arc welding type processes.

Most carbon steels have less than 0.20% silicon or equivalent deoxidizers and it is only an unusual killed carbon steel which has greater amounts, and even such steels almost never have more than 0.35% silicon. Consequently, as a practical matter this invention is particularly adapted for use with carbon steels which have less than 0.2% silicon.

Silicon is only one of the deoxidizers which are suitable and if other deoxidizers are present in the insert the amount of silicon can be reduced accordingly or can be replaced entirely by such other deoxidizers.

However, the deoxidizing effect of the various other deoxidizers are different than silicon.

For example, aluminum is about 2 to 5 times more effective than silicon. Consequently, any amount or all of the silicon shown on the vertical axis of the graph of FIG. 6 can be replaced by aluminum in the ratio of about ½ to ⅕ part of aluminum for each part of silicon. The same is true of the deoxidizer in the pipe shown in the horizontal axis of the graph, i.e., any or all of the silicon can be replaced by aluminum in the above ratios.

Thus, whereas 0.30% of silicon is necessary in the insert where there is 0.5% silicon in the pipe material, if it is desired to replace 0.10% of the 0.30% silicon in the insert with aluminum only ½ to ⅕ of such 0.10% would have to be used to produce the same deoxidizing effect, and the resulting minimum quantity of deoxidizer in the insert would be 0.20% silicon and between 0.05% and .02% aluminum. This would be equivalent or equal in deoxidizing effect to 0.30% silicon.

Furthermore, if the pipe instead of having 0.05% silicon had only 0.04% and in addition had between about 0.005% and 0.002% aluminum such amount of aluminum would be equivalent in deoxidizing effect to the .01% silicon, and hence the total deoxidizing effect in the pipe would be the equivalent of 0.05% silicon which according to the graph would require about 0.30% silicon or its equivalent in the insert.

In this way it is possible to select the minimum amount of deoxidizer in the insert for any combination of deoxidizers in the insert and pipe.

Titanium is about ½ to 1 times as effective as silicon so that 1 part of silicon can be replaced by about 2 to 1 parts of titanium as set forth above.

Vanadium is about 2 to 4 times as effective as silicon so that each part of silicon can be replaced by about ½ to ¼ part of vanadium, as set forth above.

Zirconium is about 10 to 50 times as effective as silicon so that each part of silicon can be replaced by about ⅒ to ⅟₅₀ part of zirconium, as set forth above.

Chromium is about ⅓ to ½ as effective as silicon, so that each part of silicon can be replaced by about 3 to 2 parts of chromium.

Boron is about 10 to 100 times as effective as silicon, so that each part of silicon can be replaced by about ⅒ to ⅟₁₀₀ part of boron.

Manganese is about ⅓ to ⅕ as effective as silicon, so that each part of silicon can be replaced by about 3 to 5 parts of manganese.

For convenience the amounts of these various deoxidizers may be expressed according to the deoxidizing effect they have compared to silicon. Thus, it may be said that the minimum amounts of deoxidizer (any one or combination thereof) in the insert should not be substantially less than an amount which is substantially equal in deoxidizing effect to the minimum amounts of silicon shown in FIG. 6 taking into account the above mentioned ratios.

Although numerical amounts and ratios of deoxidizer have been referred to, deoxidizers such as aluminum are apt to be burned off in part before they can perform a deoxidizing function.

Furthermore, since minimum amounts of deoxidizer in the insert depend upon welding conditions which vary substantially, it would be difficult to set forth herein the exact minimum required for each set of welding conditions. That is why it is suggested that the larger amounts shown in and above band b be used—to be even safer the larger amounts shown in and above band c are suggested. On the other hand, with good welding conditions the minimum amounts of line a–a' can be successfully used and hence from the standpoint of patent protection may be considered as minimums.

If it is desired to use just the bare minimum amount of deoxidizer in the insert and not an excess for safety, it is suggested that a trial weld be made safe with such minimum amount under the welding conditions to be used to determine whether it is bubble free. If it is not, the amount of deoxidizer in the ring should be increased until there is enough to get a bubble-free weld. Thus, the only dependable test to determine the absolute minimum for the welding conditions to be employed is to observe the weld to determine whether it is sufficiently bubble-free for the welded pipe to perform its intended function. However, this involves only a matter of routine testing and observation.

Although with the use of the proper amount of deoxidizer, welds may be consistently obtained having no bubbles which are visual on inspection of the weld or of a radiograph of the weld, the weld may have some bubbles and still be considered bubble-free as that term is used herein because these bubbles are too few or too small to prevent the pipe from being safely used for its intended purpose. Because of this it is impossible to define bubble-free with absolute accuracy. On the other hand, any person skilled in the art can quickly recognize when a weld is unsatisfactory because of bubbles and when one is satisfactory, the term bubble-free as used herein being directed to those persons skilled in the art. One standard for a weld which is sufficiently free of bubbles to be satisfactory is set forth in "Porosity Standards of the ASME Boiler and Pressure Vessel Code" published by the American Society of Mechanical Engineers, 29 West 39th Street, New York 18, New York (1954).

Furthermore, once persons skilled in the art have been taught that bubbling can be avoided in accordance with the present invention in welding carbon steel pipes by the use of a carbon steel insert with an adequate amount of deoxidizer in the insert in excess of that in the pipe they would have no trouble at all determining the proper amounts to do the job. However, as set forth above, without this teaching the problem of bubbling has prevented the successful commercial use of non-fluxing type welding techniques with carbon steel pipes.

The amount of deoxidizer in the insert should not be so great that it causes the weld to be brittle or results in the weld having a composition so different metallurgically from that of the pipe that the welded pipe is not satisfactory for its intended purpose.

The minimum amount of deoxidizer in the insert may be referred to with reference to the amount of deoxidizer which remains in the weld. Generally if the deoxidizer content of the weld is not substantially less than 0.12% silicon the amount of deoxidizer in the insert is adequate, taking into consideration the fact that same deoxidizer disappears as slag.

Silicon is a preferred deoxidizer and a preferred composition range for the insert is as follows:

| | | | |
|---|---|---|---|
| C | 0.10–0.15 | P | * 0.010–0.020 |
| Mn | 1.00–1.20 | S | * 0.015–0.030 |
| Si | 0.40–0.60 | Al | * .001–.003 |

*These amounts are considered to be traces.

A silicon or equivalent deoxidizer content of 0.35% in the insert will provide a bubble-free weld even with wrought iron. It is believed that the amount of bubbling decreases with increases in the carbon content of the pipe and insert. Accordingly the minimum quantity of deoxidizer in the insert may decrease slightly with increases in the carbon content of the pipe and insert. (FIG. 6 was prepared from a relatively low carbon steel pipe and insert.)

Using principally a silicon deoxidizer the insert composition may vary as follows:

| | | | |
|---|---|---|---|
| C | .10–.15 | P | * .01–.02 |
| Mn | .075–1.25 | S | * .015–.03 |
| Si | .20–.75 | Al | * .001–.003 |

Using principally an aluminum deoxidizer the insert composition may vary as follows:

| | | | |
|---|---|---|---|
| C | .10–.15 | P | * .01–.02 |
| Mn | .075–1.25 | S | * .015–.03 |
| Si | .00–0.15 | Al | .10–.15 |

Using principally a titanium deoxidizer the insert composition may vary as follows:

| | | | |
|---|---|---|---|
| C | .10–.15 | S | * .015–.03 |
| Mn | .075–1.25 | Al | * .001–.003 |
| Si | .00–.15 | Ti | .20–.30 |
| P | * .01–.02 | | |

Using principally a boron deoxidizer the insert composition may vary as follows:

| | | | |
|---|---|---|---|
| C | .10–.15 | S | * .015–.03 |
| Mn | .075–1.25 | Al | * .001–.003 |
| Si | .00–.15 | B | .001–.010 |
| P | * .01–.02 | | |

Using principally vanadium as a deoxidizer the insert composition may vary as follows:

| | | | |
|---|---|---|---|
| C | .10–.15 | S | * .015–.03 |
| Mn | .075–1.25 | Al | * .001–.003 |
| Si | .00–.15 | V | .10–.40 |
| P | * .01–.02 | | |

Using zirconium principally as a deoxidizer the insert composition may vary as follows:

| | | | |
|---|---|---|---|
| C | .10–.15 | S | * .015–.03 |
| Mn | .075–1.25 | Al | * .001–.003 |
| Si | .00–.15 | Zr | .05–.20 |
| P | * .01–.02 | | |

Using principally chromium as a deoxidizer the insert composition may vary as follows:

| | | | |
|---|---|---|---|
| C | .10–.15 | S | * .015–.03 |
| Mn | 0.075–1.25 | Al | * .001–.003 |
| Si | .00–.15 | Cr | 0.25–1.00 |
| P | * .01–.02 | | |

Using principally manganese as a deoxidizer the insert composition may vary as follows:

| | | | |
|---|---|---|---|
| C | .10–.15 | P | * .01–.02 |
| Mn | .60–3.75 | S | * .015–.03 |
| Si | .00–.15 | Al | * .001–.003 |

In a preferred form of the invention the deoxidizer is alloyed with the low carbon steel of the insert during the manufacture of such steel, such insert being made from the steel in a conventional way.

It is possible to provide an insert with additional necessary amounts of deoxidizer by the use of an insert made of conventional carbon steel with the necessary additional amount of deoxidizer in the form of a coating 14 around the insert 16 as shown in FIG. 5. Thus, when the insert and pipe material melt together to form the puddle the coating provides the additional deoxidizer required and it is dispersed throughout the puddle. However, this is not a preferred embodiment.

When welding piping the inserts are each in the form of a ring which may have the cross sectional shape shown in FIGS. 3 and 5.

I claim:
1. An article comprising a preformed consumable plain carbon steel welding ring for use in butt welding together plain carbon steel piping by a non-fluxing, gas shielded, arc welding process and containing an amount of solid deoxidizer metal which is not substantially less than an amount which is substantially equal in deoxidizing effect to about 0.35% silicon, said deoxidizer metal being selected from the group consisting of silicon, aluminum, titanium, boron, vanadium, zirconium, chromium and manganese.

2. An article according to claim 1, said amount of deoxidizer metal in said ring being not substantially less than an amount which is substantially equal in deoxidizing effect to about 0.65% silicon.

3. An article according to claim 1, said amount of deoxidizer metal in said ring being not substantially less than an amount which is substantially equal in deoxidizing effect to about 0.95% silicon.

4. An article according to claim 1, said amount of deoxidizer metal in said ring being not substantially less than an amount which is equal in deoxidizing effect to about 0.5% silicon and being not substantially greater than an amount which is substantially equal in deoxidizing effect to about 1.1% silicon.

5. An article according to claim 1, the opposite sides of said ring being substantially planar.

References Cited by the Examiner
UNITED STATES PATENTS

| | | | |
|---|---|---|---|
| 2,133,058 | 10/1938 | Paine | 29—491 X |
| 2,158,105 | 5/1939 | Burgess | 29—196.1 |
| 2,303,250 | 11/1942 | Balke | 113—110 |
| 3,033,145 | 5/1962 | Thielsch | 113—136 |

FOREIGN PATENTS 573,405   3/1959   Canada.

WHITMORE A. WILTZ, Primary Examiner.

JOHN F. CAMPBELL, MICHAEL V. BRINDISI, CHARLES W. LANHAM, Examiners.